No. 679,444. Patented July 30, 1901.
J. H. VINTON.
BUTTON ATTACHING MACHINE.
(Application filed Mar. 20, 1901.)

(No Model.) 6 Sheets—Sheet 1.

Witnesses: Louis C. Jones. Sydney E. Taft.

Inventor: John H. Vinton by his Attorney Charles V. Goodwin.

No. 679,444. Patented July 30, 1901.
J. H. VINTON.
BUTTON ATTACHING MACHINE.
(Application filed Mar. 20, 1901.)
(No Model.) 6 Sheets—Sheet 3.

Witnesses:
Louis A. Jones.
Sydney E. Taft.

Inventor:
John H. Vinton
By his Attorney
Charles N. Goodwin

No. 679,444. Patented July 30, 1901.
J. H. VINTON.
BUTTON ATTACHING MACHINE.
(Application filed Mar. 20, 1901.)
(No Model.) 6 Sheets—Sheet 5.
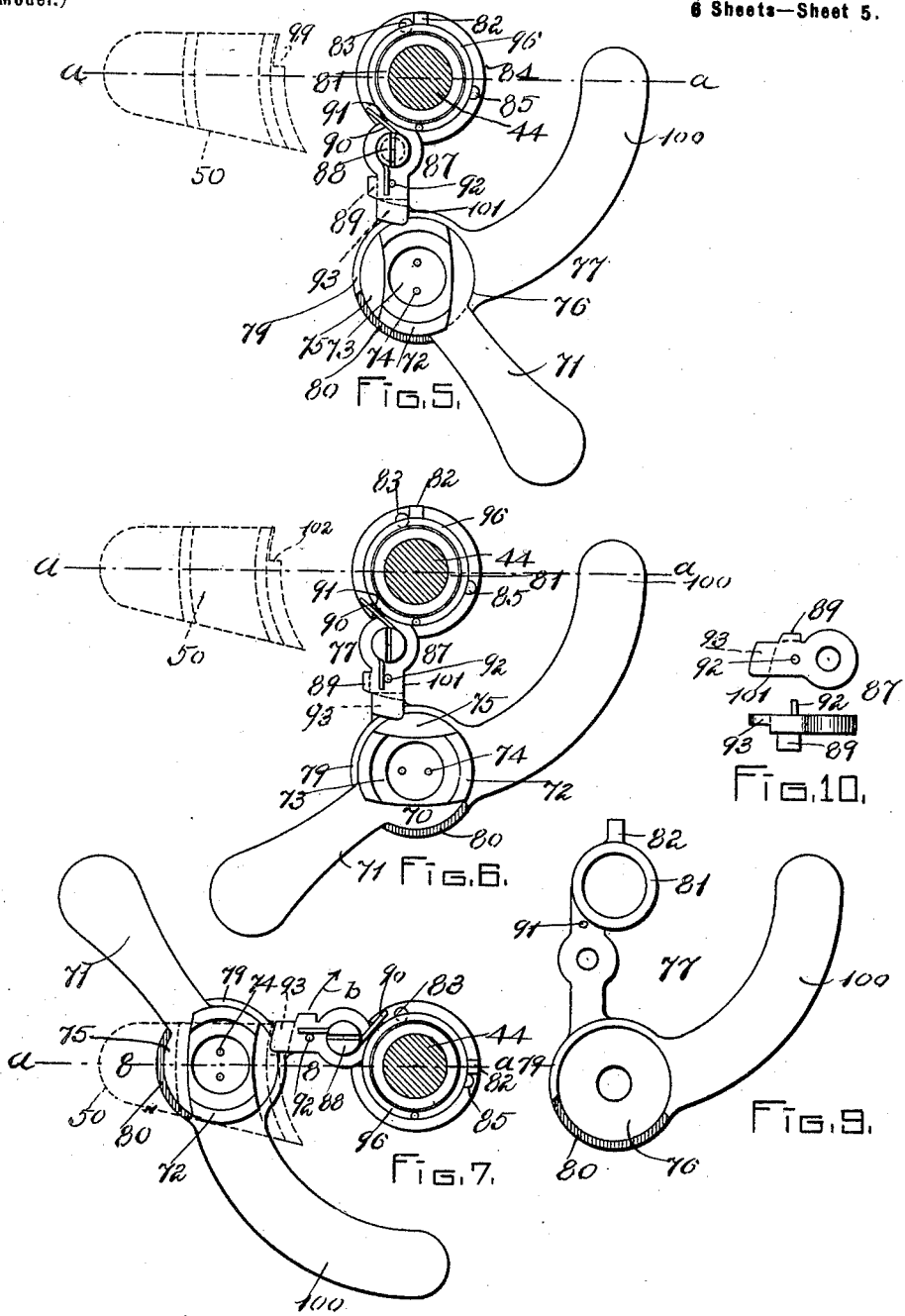

No. 679,444. Patented July 30, 1901.
J. H. VINTON.
BUTTON ATTACHING MACHINE.
(Application filed Mar. 20, 1901.)

(No Model.) 6 Sheets—Sheet 6.

WITNESSES: Louis A. Jones. Sydney E. Taft.

INVENTOR: John H. Vinton
by his Attorney, Charles N. Goodwig

THE NORRIS PETERS CO., PHOTO-LITHO., WASHINGTON, D. C.

UNITED STATES PATENT OFFICE.

JOHN H. VINTON, OF BOSTON, MASSACHUSETTS, ASSIGNOR TO ROBERT AMORY, OF SAME PLACE.

BUTTON-ATTACHING MACHINE.

SPECIFICATION forming part of Letters Patent No. 679,444, dated July 30, 1901.

Application filed March 20, 1901. Serial No. 52,052. (No model.)

*To all whom it may concern:*

Be it known that I, JOHN H. VINTON, a citizen of the United States, residing at Boston, in the county of Suffolk and State of Massachusetts, have invented new and useful Improvements in Machines for Attaching Buttons to Clothing by Wire Fasteners, of which the following is a specification.

The object of this invention is to produce a convenient, cheap, and practical machine for attaching buttons to clothing and the like by means of wire fasteners, and is in certain features, notably the clenching-die and spring-pressed button-holder, substantially the same in construction and operation as the two inventions for which I have made application for Letters Patent of the United States, Serial Nos. 43,923 and 43,924.

The invention consists in mechanism for removing the lowermost button from a column of buttons and carrying said button to a button-holder in readiness to be attached to fabric.

The invention further consists in mechanism for locating said button with the holes in proper relation to the fastener, the legs of which are to be driven through said holes.

The invention still further consists in the combination and arrangement of parts set forth in the following specification, and particularly pointed out in the claims thereof.

Figure 1:
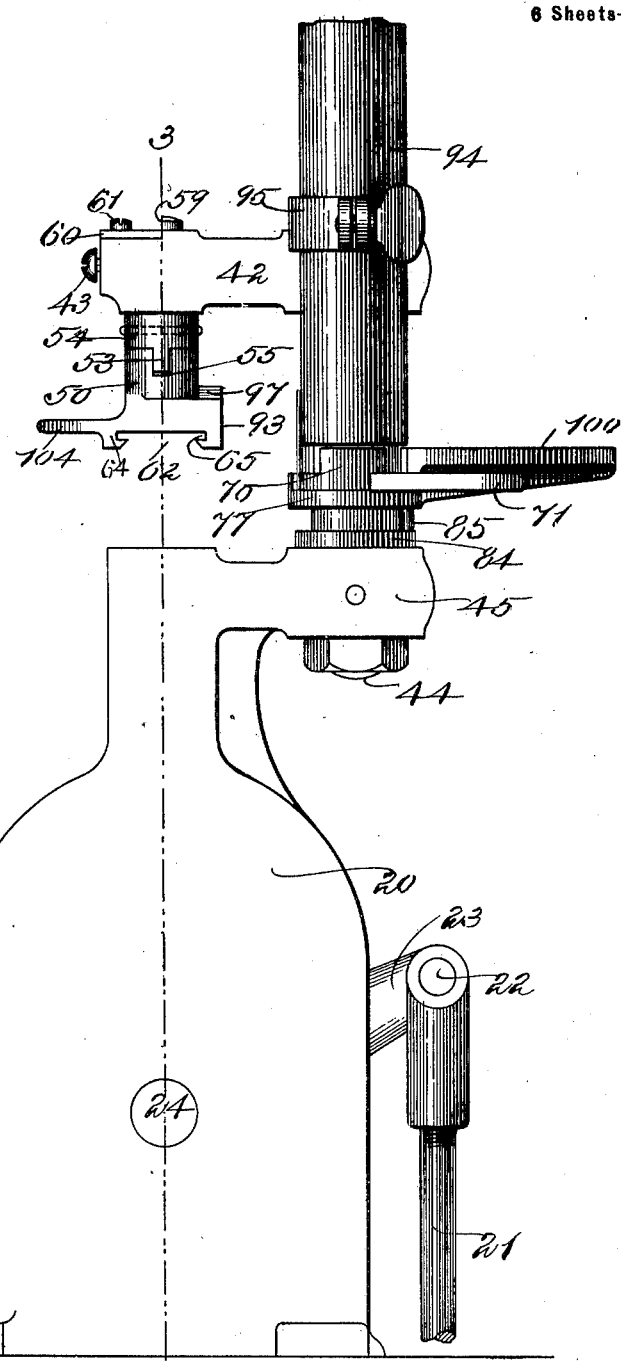
Figure 2:
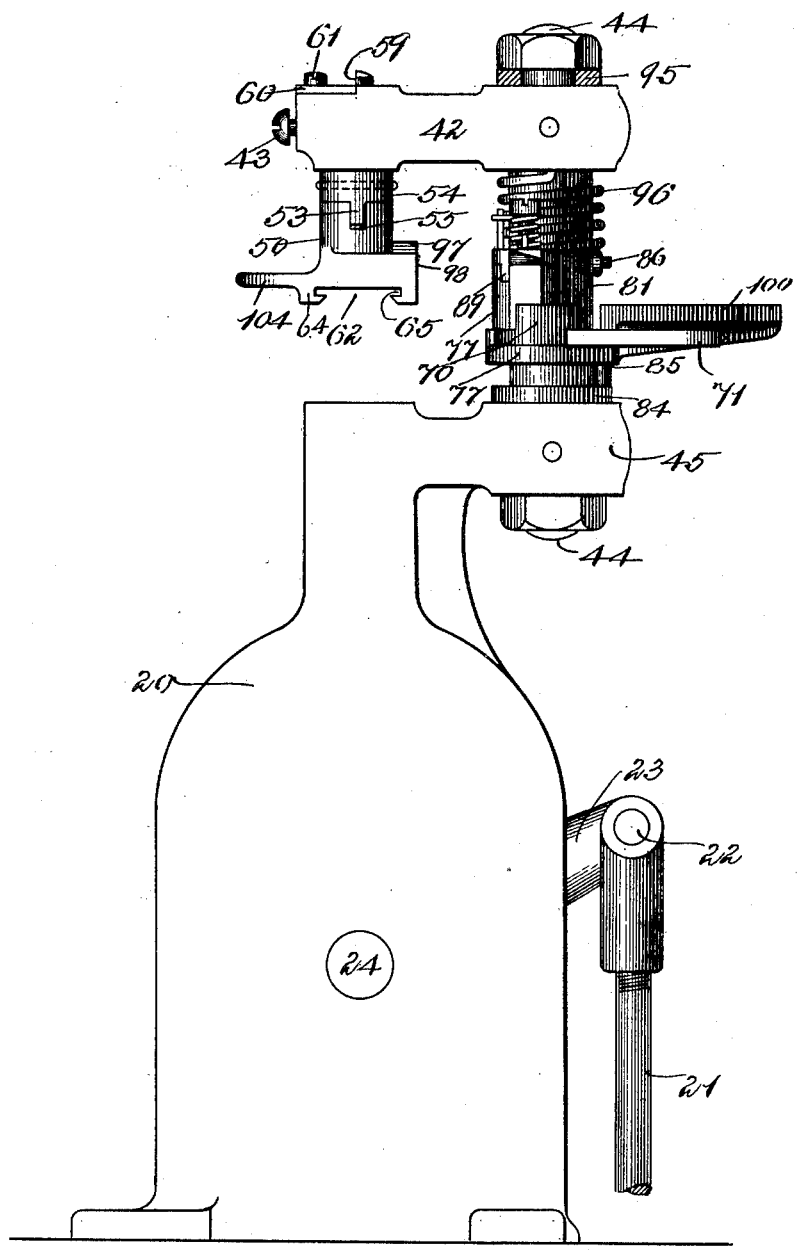
Figure 3:
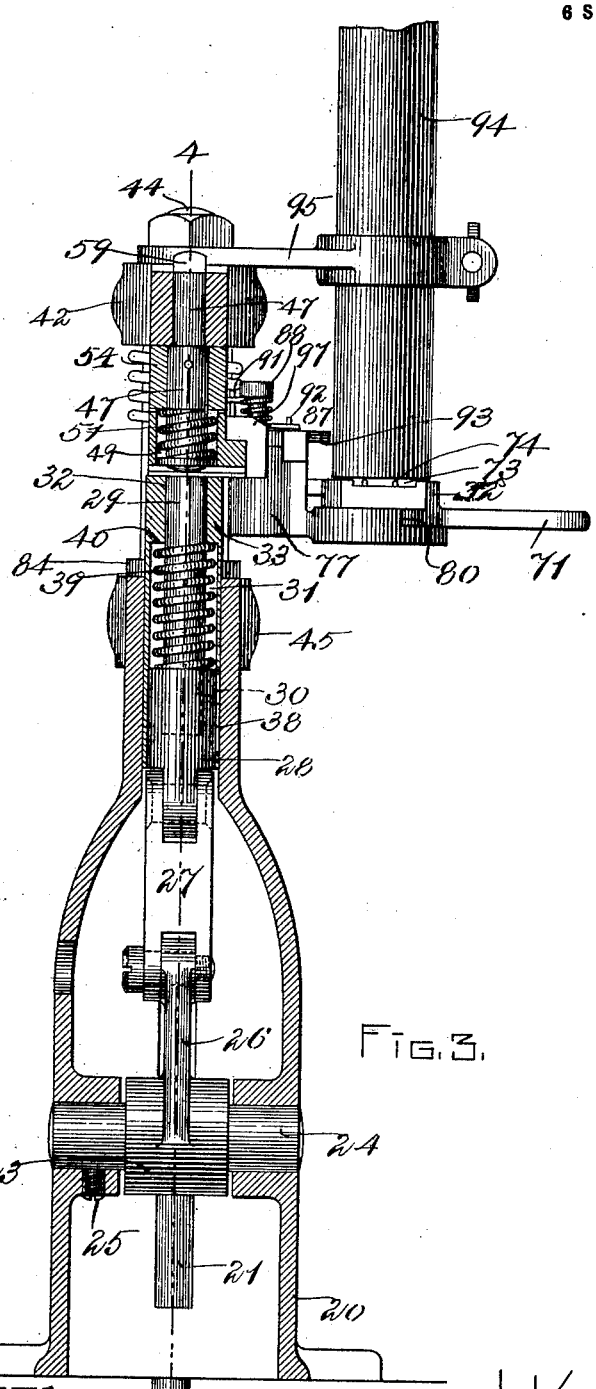
Figure 4:
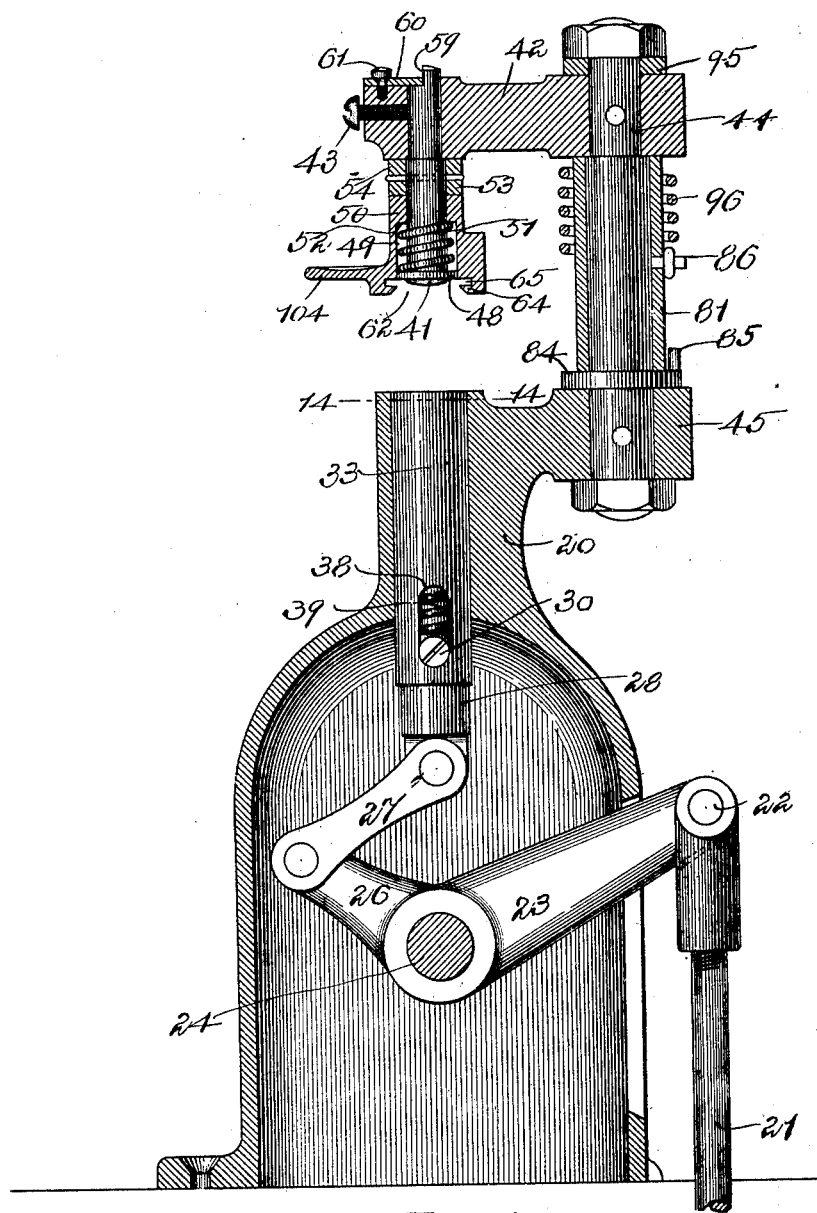
Figure 11:
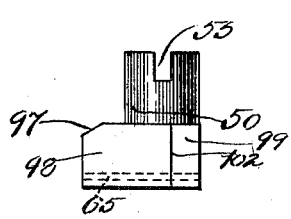
Figure 14:
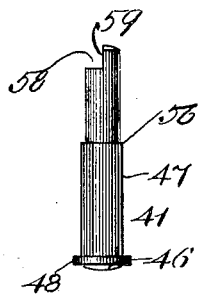
Figure 12:
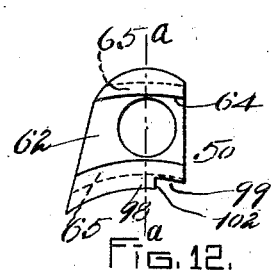
Figure 13:
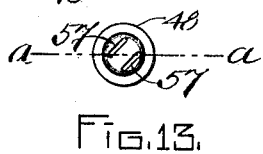
Figure 16:
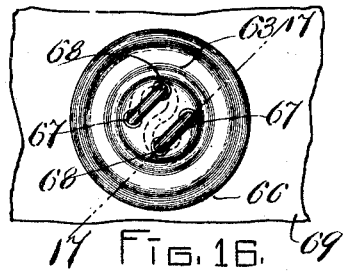
Figure 15:
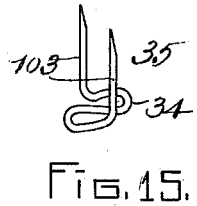
Figure 17:
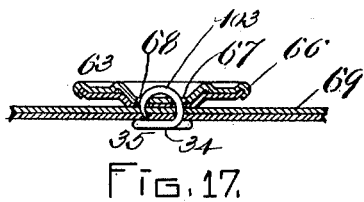
Figure 18:
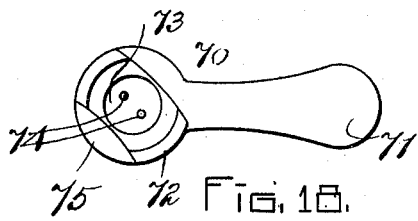
Figure 19:
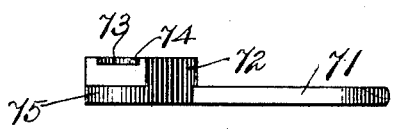

Referring to the drawings, Figure 1 is a side elevation of my improved machine for attaching buttons to garments. Fig. 2 is a view similar to Fig. 1, with the button-tube removed therefrom, the supporting-arm for said tube being shown in section. Fig. 3 is a vertical section taken on line 3 3, Fig. 1, looking toward the right in said figure, the parts being shown in the positions assumed when the treadle is lowered. Fig. 4 is a vertical section taken on line 4 4, Fig. 3, looking toward the left in said figure or in the same direction as in Figs. 1 and 2, the parts being shown in the relative positions assumed when the treadle is raised, as in Figs. 1 and 2. Figs. 5, 6, and 7 are detail plan views showing the rocking locator and button-carrying arm in different positions with relation to each other, the button-holder being shown in dotted lines. Fig. 8 is a detail section taken on line 8 8, Fig. 7. Fig. 9 is a detail plan view of the button-carrying arm. Fig. 10 is a detail plan and side elevation of the spring-latch. Fig. 11 is a rear elevation of the button-holder. Fig. 12 is an underneath plan of said button-holder. Fig. 13 is a side elevation and underneath plan of the die for turning over the prongs of the fastener. Fig. 14 is a detail section taken on line 14 14, Fig. 4. Fig. 15 is a perspective view of the wire fastener, by means of which the button is attached to the fabric. Fig. 16 is an enlarged plan view of a button, showing the same attached to a portion of fabric by a fastener. Fig. 17 is a section taken on line 17 17 of Fig. 16. Fig. 18 is a plan view of the rocking button-locator. Fig. 19 is a side elevation of said button-locator.

Like letters and numerals refer to like parts throughout the several views of the drawings.

In the drawings, 20 is the frame of a machine adapted to be fastened by screws to the top of a table or bench and having a treadle of suitable design and construction connected to the machine by a treadle-rod 21. The treadle-rod 21 is pivotally connected by a pin 22 to a rock-lever 23. The rock-lever 23 rocks upon a stationary shaft 24, fast to the frame 20 by a set-screw 25. The short arm 26 of the rock-lever 23 is connected by a link 27 to the lower end of a reciprocatory plunger 28, having an anvil 29 fast thereto by a screw 30 and extending upwardly from said plunger through a chamber 31 and guide-passage 32 in the fastener-holder 33. Said guide-passage and anvil are of the same outline in cross-section, said outline being the same as the outline of the S-head 34 of the fastener 35 and consisting of two semicircular arcs 36 36, arranged upon opposite sides of a median line and connected together by straight guide-walls 37 37, Fig. 14.

The fastener-holder extends downwardly from the top of the anvil, encircles the reciprocatory plunger 28, and has a slot 38 therein to receive the head of the screw 30. A spiral spring 39 encircles the anvil 29, one end of said spiral spring bearing against the upper end of the plunger 28 and the upper end of said spiral spring bearing against a shoulder 40 in the fastener-holder 33.

The clenching-die 41 is fastened to an arm 42 by a set-screw 43. The arm 42 is fast to a stud 44, said stud being in turn fast to a boss 45 upon the frame of the machine. The clenching-die 41, Fig. 13, consists of a cylindrical block of steel, having a head portion 46 and a shank portion 47. The head portion 46 of said die is convexly curved upon the under side thereof and has a flange 48 thereon, which is formed to fit in the chamber 49 in the spring-pressed button-holder 50. The shank 47 is encircled by a spiral spring 51, one end of which bears against the flange 48 and the other against the shoulder 52 in said button-holder. The button-holder 50 is adapted to slide lengthwise upon the shank of the clenching-die 41 in a direction at right angles to the face of said die and is prevented from turning upon said shank, and thus changing its location with relation thereto in a plane parallel to the face thereof, by a tongue 53 upon a collar 54, which projects into and fits an arch 55 on said button-holder.

It will be seen that the action of the spring 51 is to hold the button-holder 50 up against the collar 54, said collar being pinned to the die-shank 47, with its upper face resting against the under side of the arm 42. The die-shank 47 is shouldered at 56, and said shoulders rest against the under side of the arm 42.

In the under face of the head portion 46 of the clenching-die 41 are two grooves 57, parallel to each other and standing at forty-five degrees to the longitudinal median line $a$ of the machine, said grooves being for the purpose of turning over and clenching the legs of the fastener 35. In order to set the grooves 57 at forty-five degrees with the longitudinal median line $a$, the top of the shank portion 47 has a notch 58 cut across to the center thereof, leaving a straight face 59 thereon, which stands at an angle of forty-five degrees with the grooves 57 and at right angles to said median line $a$. A plate 60, fast to the arm 42 by a screw 61 and a dowel-pin, (not shown,) bears against the face 59 and lines it up, so that the grooves 57 are necessarily set correctly at forty-five degrees to the median line $a$.

The spring-pressed button-holder 50 has a curved slot 62 in the lower end thereof to receive a button 63. Said slot extends across the under face of said button-holder and has two side walls 64 struck on a curve described from the center of the stud 44 when said button-holder is in the position shown in Fig. 7. Each of the side walls 64 has a groove 65 therein to receive the rim 66 of the button 63, said grooves being also struck from the center of the stud 44 when the button-holder is in the position shown in Fig. 7.

The button 63 has four holes 67 67 and 68 68 therein, forming the four corners of a square, in which the holes 67 67 are diagonally opposite each other, and 68 68 are also diagonally opposite each other. It is necessary that the button shall be placed in the holder 50 with the holes 67 67 exactly on the median line $a$ of the machine, so that when the legs of the fastener are forced through the fabric 69, to which the button is fastened, said legs shall register with the holes 67 in the button and pass through said holes to be turned over and back by the grooves 57 in the die 41. To accomplish this, I provide a rocking button-locator 70. The button-locator 70 has a handle 71 and a cylindrical segmental hub 72 thereon. Said segmental hub 72 has a recess 73 therein to receive the rim of the button 63 and two vertical pins 74, fast thereto, extending upwardly from the bottom of said recess and adapted to engage two of the diagonally-opposite holes in the button 63. The button-locator 70 has a cylindrical flange 75 thereon, formed to fit the corresponding recess 76 in the button-carrier arm 77 and attached to said arm by a shouldered screw 78, screwed into said locator and arranged to rock in said carrier-arm. The flange 79, surrounding the recess 76 is slotted at 80 to allow the button-locator to rock in said recess 76. The carrier-arm 77 has a hub 81 integral therewith and arranged to rock upon the stud 44. Said hub has a lug 82 thereon, which engages a stop-pin 83, fast to a flange 84 upon the stud 44 when the carrier-arm is in the position shown in Fig. 5, and engages another stop-pin 85 when the carrier-arm is in the position shown in Fig. 7. The hub 81 is surrounded by a spiral torsional spring 96, one end thereof fast to the arm 42 and the other to a pin 86, fast to said hub. A spring-latch 87 is pivotally attached to the carrier-arm 77 by a shouldered screw 88. Said latch has a stop-lug 89 projecting downwardly therefrom and held against the carrier-arm 77 by a torsional spiral spring 90, one end thereof bearing against a pin 91 upon said carrier-arm and the other end bearing against a pin 92 upon said latch. The outer end of the latch 87 is beveled off at 93 for a purpose hereinafter described.

The buttons used in the machine are contained in a tube 94, said tube being supported in a spring-clamped bracket 95, fast by a nut to the upper end of the stud 44.

The operation of the machine as a whole is as follows: Assuming the parts to be in the position shown in Figs. 1, 2, and 5, the tube 94, containing a column of buttons and the rocking locator and carrier-arm beneath said tube, the operator first places a fastener in the guide-passage 32 of the fastener-holder 33. He then takes the button-locator 70 by the handle 71 and rocks the same, drawing it toward him from the position shown in Fig. 5 to that shown in Fig. 6. This rocking motion carries the pins 74, together with the button-locator, through a quarter-rotation from the position shown in Fig. 5 to that shown in Fig. 6, the carrier-arm being held in the same position in both of said figures by the spiral torsional spring 96. The pins 74 during this quarter-rotation of the button-locator find two of the diagonally-opposite holes in the lowermost button in the button-tube 94, and as soon as the handle 71 of said locator has traveled the extent of the slot 80 in the flange 79 the side of said handle will abut against the end of the slot 80, as shown in Fig. 6, and said locator and carrier-arm will then rock as one piece upon the stud 44, overcoming the tension of the spiral spring 96 and carrying the lowermost button from the tube 94 with them. As the carrier-arm and button-locator are thus rocked upon the stud 44, the incline 93 upon the spring-latch 87 abuts against an incline 97 on the button-holder 50, and a further rotation of said carrier-arm and button-locator forces the button-holder 50 downwardly against the action of the spiral spring 51, bringing the grooves 65 in said button-locator downward into line with the projecting rim 66 of the button 63. When the button-locator and carrier-arm have arrived at the position shown in Fig. 7, the latch 87 passes by the flange 98 upon the rear side of said button-holder, and arriving opposite the notch 99, where said flange is cut away, the spiral spring 51 forces said button-holder upwardly, removing the button 63 from the button-locator 70. While the carrier-arm has been rocked from the position shown in Fig. 5 to that shown in Fig. 7 the buttons in the tube 94 are prevented from falling out of said tube upon the floor by a segmental plate 100, integral with said carrier-arm and extending beneath the tube 94, formed upon an arc of a circle described from the center of the stud 44. The operator now releases the handle 71 and the spiral spring 96 carries the carrier-arm back from the position shown in Fig. 7 to that shown in Fig. 6, the button-locator still maintaining the same relation to said carrier-arm in which it is shown in Fig. 7. The operator next rocks the button-locator upon the carrier-arm 77 by means of the handle 71 into the position shown in Fig. 5. In order to more fully explain the action of the button-locator and carrier-arm, it will be seen that when the operator first starts to carry a button from the button-tube to the button-holder the parts are in the position shown in Fig. 5. The operator rocks the button-locator upon the carrier-arm by means of the handle 71 until said handle arrives at the end of the slot in the carrier-arm, said carrier-arm meanwhile having been kept stationary by the spiral spring 96; but as soon as the handle arrives at the end of the slot in the carrier-arm said carrier-arm, button-locator, and handle move as one piece, rocking upon the stud 44 until the center of the button comes in line with the center of the button-holder, as set forth. Now when the operator releases the handle 71 the position of said handle with relation to the button-carrier will be as shown in Fig. 7 and the torsional spiral spring 96 will carry the button-carrier and the button-locator back to the position shown in Fig. 6. Before the operator again swings the carrier-arm around to the button-holder in order to carry another button to the said button-holder from the column of buttons in the tube he pushes the handle 71 from the position shown in Fig. 6 to that shown in Fig. 5, and then repeats the operation hereinbefore described. Upon its return motion and during the first part thereof the rear face 101 of the spring-latch 87 abuts against the vertical wall 102 of the notch 99 upon the flange 98 and is rocked upon the pivotal screw 88, allowing said arm to be carried back, as hereinbefore described, to the position shown in Fig. 6. It will be noted that when the carrier-arm is moved, as hereinbefore described, from the position shown in Fig. 6 to the position shown in Fig. 7 the latch operates to lower the button-holder, being prevented from rotating upon its pivot 88 by the stop-lug 89, and when the carrier-arm returns, upon being released by the operator, from the position shown in Fig. 7 to that shown in Fig. 6 the rear face 101 of the spring-latch 87 encounters the stationary vertical wall 102 upon the button-holder and swings upon its pivot 88, allowing the latch to pass by the button-holder without moving said button-holder. The button now being in position in the button-holder and the fastener in the fastener-holder, the operator places the fabric 69 upon the top of the fastener-holder 33 and operates the treadle to depress the treadle-rod 21, rocking the lever 23 upon the stationary shaft 24, and through the short arm 26 of said lever and the link 27 raising the plunger 28 and fastener-holder 33, together with the fabric resting on top of said fastener-holder, until said fabric is brought against the back face of the button held in said button-holder, whereupon the fastener-holder rests in the anvil 29, is carried upwardly, forcing the fastener out of the guide-passage 32, driving the legs 103 through the fabric 69, through the holes 67 in the button, and into the grooves 57 upon the die 41, thence along said grooves and back through the holes 68 in said button, finally clenching the points of said legs against the S-head of said fastener, as shown in Figs. 16 and 17. Upon releasing the treadle the parts of the machine assume the relative positions shown in Fig. 1, and the operator then removes the button from the button-holder by pushing said button-holder downwardly by means of the handle 104 thereon until the legs of the fastener are clear of the grooves 57 in the clenching-die, and then drawing the button out of the grooves 65 in said button-holder by means of the fabric 69.

Having thus described my invention, what I claim, and desire to secure by Letters Patent, is—

1. In a machine for attaching buttons to garments by wire fasteners, a pivoted button-carrying arm, a button-locator carried by said arm, and a handle fast to said button-locator by means of which said locator is rocked upon said button-carrying arm.

2. In a machine for attaching buttons to garments by wire fasteners, a pivoted button-carrying arm, a button-locator carried by said arm, a handle fast to said button-locator by means of which said locator is rocked upon said button-carrying arm, and means to limit the extent of said rocking movement with relation to said carrier-arms.

3. In a machine for attaching buttons to garments by wire fasteners, a pivoted button-carrying arm, a button-locator carried by said arm, and a handle fast to said button-locator by means of which said locator is rocked upon said button-carrying arm and said button-carrier arm is rocked upon its pivot.

4. In a machine for attaching buttons to garments by wire fasteners, a pivoted button-carrying arm, a button-locator carried by said arm, a handle fast to said button-locator by means of which said locator is rocked upon said button-carrying arm, and a spring arranged to hold said carrier-arm stationary during said rocking movement.

5. In a machine for attaching buttons to garments by wire fasteners, a pivoted button-carrying arm, a button-locator carried by said arm, a handle fast to said button-locator by means of which said locator is rocked upon said button-carrying arm and said button-carrier arm is rocked upon its pivot, means to limit the extent of the rocking movement of said locator with relation to said arm, and a spring arranged to hold said carrier-arm stationary during said rocking movement of the button-locator and to move said carrier-arm in the opposite direction to that in which it is moved by means of said button-locator handle.

6. In a machine for attaching buttons to garments by wire fasteners, a pivoted button-carrier arm, a button-locator having a recess therein to receive a button, said locator carried by said arm and arranged to rock thereon, and a handle fast to said button-locator and arranged to travel in a slot in said carrier-arm.

7. In a machine for attaching buttons to garments by wire fasteners, a pivoted button-carrier arm, a button-locator having a recess therein to receive a button, said locator carried by said arm and arranged to rock thereon, a spring arranged to hold said carrier-arm stationary during said rocking movement, and a handle fast to said button-locator and arranged to travel in a slot in said carrier-arm.

8. In a machine for attaching buttons to garments by wire fasteners, a clenching-die, a button-holder, a spring acting to press a button held by said button-holder against the face of said clenching-die, a button-carrier, and mechanism actuated by said button-carrier to depress said button-holder against the action of said spring in order to insert a button carried by said button-carrier.

9. In a machine for attaching buttons to garments by wire fasteners, a clenching-die, a button-holder, a spring acting to press a button held by said button-holder against the face of said clenching-die, a button-carrier, mechanism actuated by said button-carrier to depress said button-holder against the action of said spring in order to receive a button carried by said button-carrier, and mechanism to release said button-holder, whereby the button carried by said button-carrier is removed therefrom by said button-holder.

10. In a machine for attaching buttons to garments by wire fasteners, a clenching-die having a cylindrical shank and a flange adjacent to the working face thereof, a button-holder encircling said shank and flange and adapted to move lengthwise thereof, a chamber in said holder, a spring in said chamber one end bearing against said flange and the other against said holder and acting to press a button held by said holder against the face of said die, a button-carrier, and mechanism actuated by said carrier to depress said button-holder against the action of said spring in order to receive a button carried by said button-carrier.

11. In a machine for attaching buttons to garments by wire fasteners, a clenching-die having a cylindrical shank and a flange adjacent to the working face thereof, a button-holder encircling said shank and flange and adapted to move lengthwise thereof, a chamber in said holder, a spring in said chamber one end bearing against said flange and the other against said holder and acting to press a button held by said holder against the face of said die, a button-carrier, mechanism actuated by said carrier to depress said button-holder against the action of said spring in order to receive a button carried by said button-carrier, and mechanism to release said button-holder, whereby the button carried by said carrier is removed therefrom by said button-holder.

In testimony whereof I have hereunto set my hand in presence of two subscribing witnesses.

JOHN H. VINTON.

Witnesses:
CHARLES S. GOODING,
GEORGE A. TARBELL.